(12) United States Patent
You

(10) Patent No.: US 10,535,857 B2
(45) Date of Patent: Jan. 14, 2020

(54) END PLATE ASSEMBLY OF BATTERY MODULE AND BATTERY MODULE

(71) Applicant: CONTEMPORARY AMPEREX TECHNOLOGY CO., LIMITED, Ningde (CN)

(72) Inventor: Shubing You, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 15/839,353

(22) Filed: Dec. 12, 2017

(65) Prior Publication Data

US 2018/0183033 A1 Jun. 28, 2018

(30) Foreign Application Priority Data

Dec. 27, 2016 (CN) .................... 2016 2 1443536 U

(51) Int. Cl.
*H01M 2/02* (2006.01)
*H01M 2/10* (2006.01)
(Continued)

(52) U.S. Cl.
CPC ......... *H01M 2/266* (2013.01); *H01M 2/0212* (2013.01); *H01M 2/1077* (2013.01);
(Continued)

(58) Field of Classification Search
CPC .... H01M 2/0212; H01M 2/10; H01M 2/1016; H01M 2/266; H01M 10/0481; H01M 2/1077; H01M 2/347
See application file for complete search history.

(56) References Cited

U.S. PATENT DOCUMENTS

2011/0262785 A1 10/2011 Johnson et al.
2016/0308186 A1* 10/2016 Han .................... H01M 2/1016

FOREIGN PATENT DOCUMENTS

| EP | 0998765 A1 | 5/2000 |
|---|---|---|
| JP | 2001/167745 A | 6/2001 |
| JP | 2009/168062 A | 7/2009 |

OTHER PUBLICATIONS

European Extended Search Report on patent application No. EP17209204.1, dated May 30, 2018.

* cited by examiner

*Primary Examiner* — Basia A Ridley
*Assistant Examiner* — Heng M. Chan
(74) *Attorney, Agent, or Firm* — Moser Taboada

(57) ABSTRACT

The present application relates to an end plate assembly of a battery module and a battery module. The end plate assembly includes an end plate and an energy absorbing component, the energy absorbing component is arranged between the end plate and a battery, the energy absorbing component includes a stress bearing plate and a bending plate, the bending plate and the stress bearing plate are connected with each other. After the battery module is assembled, if the battery of the battery module expands and applies an expansion force to the energy absorbing component, then the bending plate of the energy absorbing component will deform elastically, so as to absorb the expansion force of the battery. Therefore, the end plate of the end plate assembly will stress smaller expansion force, so as to prevent the battery module from failure, thereby improving structural strength of the battery module.

6 Claims, 4 Drawing Sheets

(51) Int. Cl.
*H01M 10/04* (2006.01)
*H01M 2/26* (2006.01)
(52) U.S. Cl.
CPC ..... *H01M 2/1094* (2013.01); *H01M 10/0481* (2013.01); *H01M 2200/20* (2013.01); *H01M 2220/20* (2013.01)

END PLATE ASSEMBLY OF BATTERY MODULE AND BATTERY MODULE

CROSS-REFERENCE TO RELATED APPLICATIONS

The present application claims the benefit of priority to Chinese Patent Application No. 201621443536.1, filed on Dec. 27, 2016, the content of which is incorporated herein by reference in its entirety.

TECHNICAL FIELD

The present application relates to the technical field of batteries and, particularly, relates to an end plate assembly of a battery module and a battery module.

BACKGROUND

The housing is one of the core components of a battery module, the interior of the housing forms space for accommodating the battery. A traditional housing of a battery module mainly includes a pair of side plates, a pair of end plates, a bottom plate and a top plate. The end plates are fixed with the side plates through welding, screw threads etc. As continuous increasing of capacity of the battery module, the expansion force applied to the housing by the battery in the housing is also continuously increasing, which may easily cause deformation and displacement of the end plate, leading to connection failure between the side plates and the end plates (such as welding seam failure between the side plates and the end plates, bolt connection failure between the side plates and the end plates caused by an overlarge shearing force). Therefore, traditional battery modules have the problem of low structural strength.

SUMMARY

The present application provides an end plate assembly of a battery module and a battery module, so as to improve structural strength of the battery module.

A first aspect of the present application provides an end plate assembly of a battery module, including an end plate and an energy absorbing component, the energy absorbing component is arranged between the end plate and a battery in the battery module, the energy absorbing component includes a stress bearing plate and a bending plate, and the bending plate and the stress bearing plate are connected with each other.

Preferably, the energy absorbing component includes a plurality of stress bearing plates; the plurality of stress bearing plates is arranged parallel to each other.

Preferably, one end of the energy absorbing component is connected with the end plate through the stress bearing plate, and the other end of the energy absorbing component abuts with the battery through the stress bearing plate.

Preferably, the bending plate is arranged between each two adjacent stress bearing plates.

Preferably, a plurality of bending plates is arranged between each two adjacent stress bearing plates, and the plurality of bending plates is spaced from each other.

Preferably, each of the plurality of bending plates includes a first flat plate and a second flat plate, one end of the first flat plate and one end of the second flat plate are connected with each other to form a V-shaped structure, the other end of the first flat plate and the other end of the second flat plate are respectively connected with an adjacent stress bearing plate.

Preferably, the first flat plate and the second flat plate have a deforming path in a direction away from an opening direction of an outermost V-shaped structure formed by adjacent stress bearing plates.

Preferably, deformation directions of every two adjacent bending plates are opposite to each other.

Preferably, further including a plastic end plate, wherein a through hole is defined in the plastic end plate, and the energy absorbing component goes through the through hole.

A second aspect of the present application provides a battery module, including any one of the above end plate assemblies.

The technical solution provided by the present application can reach the following beneficial effects:

The end plate assembly of a battery module provided by the present application includes an end plate and an energy absorbing component, the energy absorbing component includes a stress bearing plate and a bending plate, after the battery module is assembled, if the battery of the battery module expands and applies an expansion force to the energy absorbing component, then the bending plate of the energy absorbing component will deform elastically, so as to absorb the expansion force of the battery. Therefore, the end plate of the end plate assembly will stress smaller expansion force, so as to prevent the battery module from failure, thereby improving structural strength of the battery module.

It should be understood that, the above general description and the following detailed description are just exemplary, which cannot limit the present application.

REFERENCE SIGNS

Figure 1:
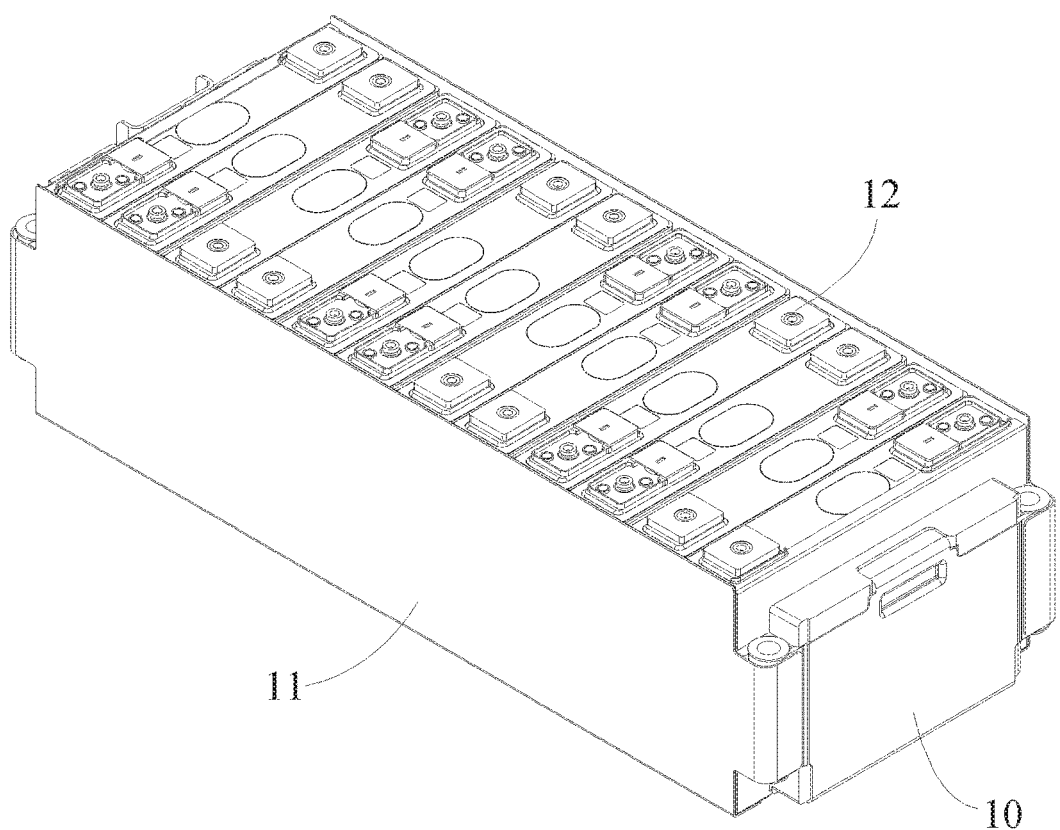
FIG. 1 is a structural schematic diagram of a battery module provided by an embodiment of the present application.
Figure 2:
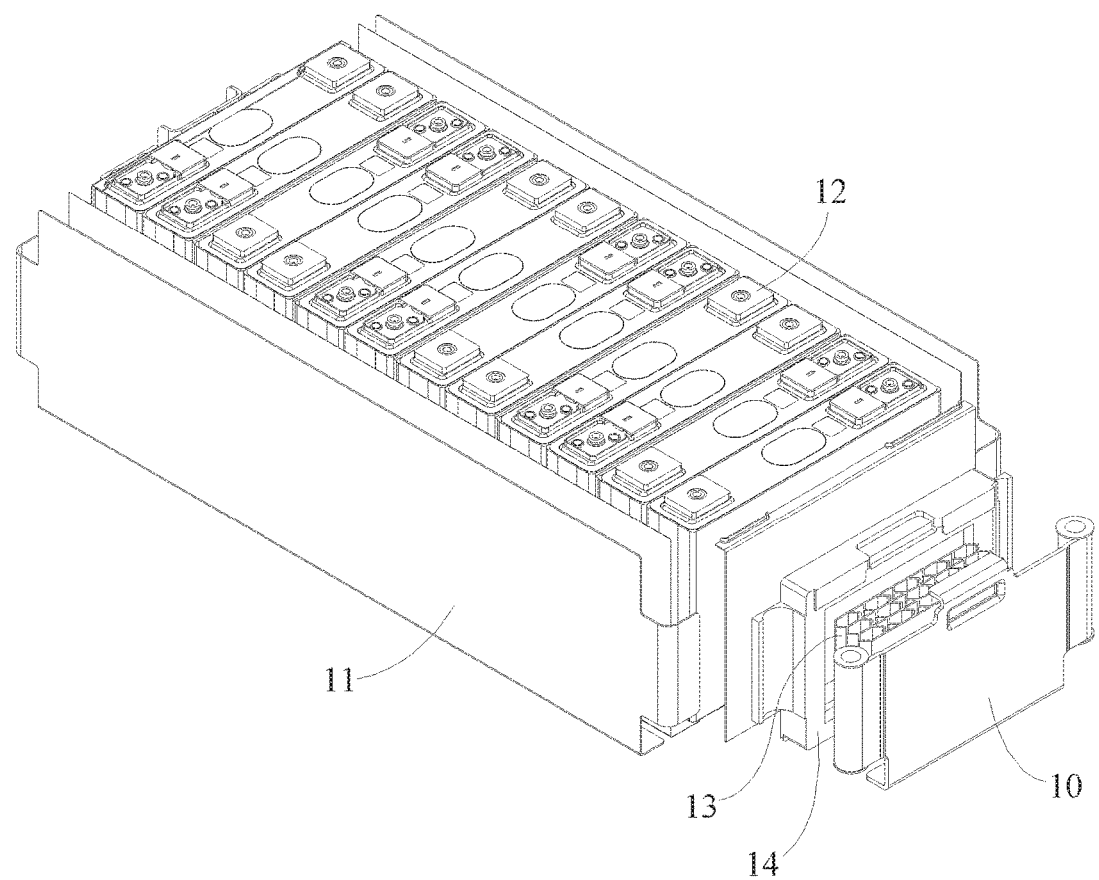
FIG. 2 is an explosive view of the battery module shown in FIG. 1.
Figure 3:
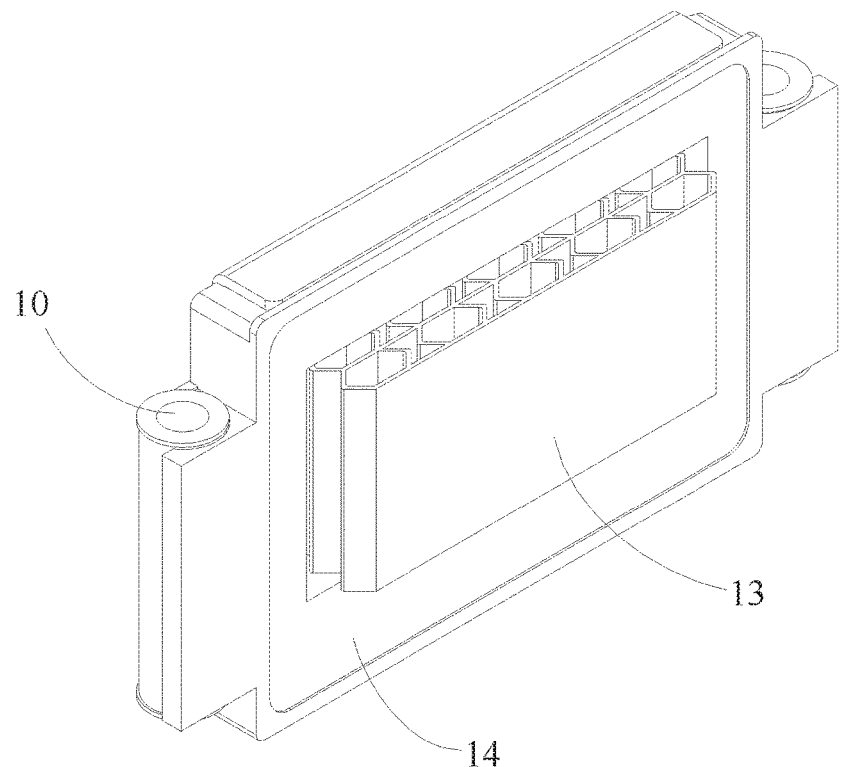
FIG. 3 is a partial structural schematic diagram of an end plate assembly of a battery module provided by an embodiment of the present application.
Figure 4:
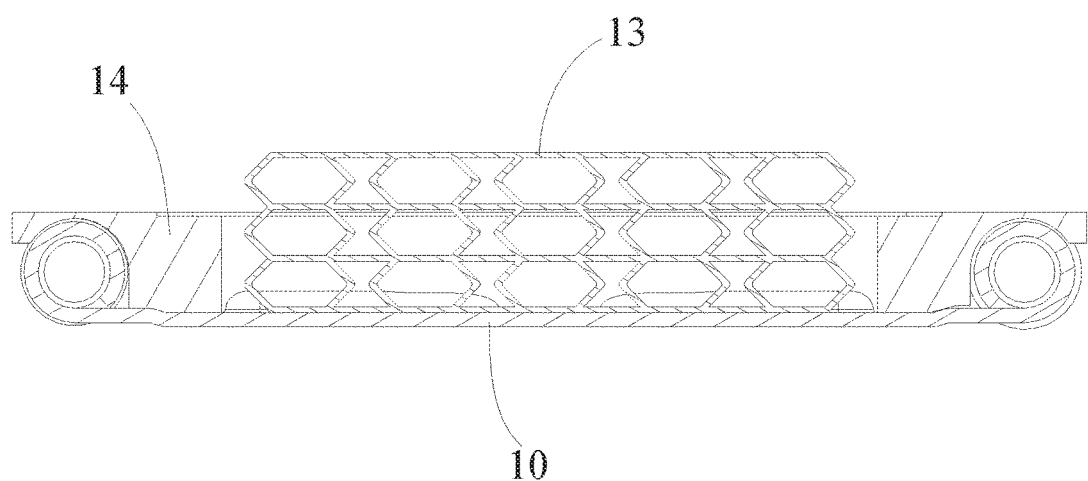
FIG. 4 is a sectional view of the structure shown in FIG. 3.

10—end plate;
11—side plate;
12—battery;
13—energy absorbing component;
130—stress bearing plate;
131—bending plate;
131*a*—first flat plate;
131*b*—second flat plate;
14—plastic end plate.

The drawings are incorporated into the present description and form a part thereof, which show embodiments of the present application, and are used to explain the principle of the present application together with the description.

DETAILED DESCRIPTION

The present application will be described in further detail with reference to the following embodiments and the accompany drawings.

As shown from FIG. 1 to FIG. 6, embodiments of the present application relates to a battery module, the battery module can include an end plate assembly of a battery module, a pair of side plates 11, a bottom plate and a top plate. The end plate assembly, the pair of side plates 11, the bottom plate and the top plate together form space for accommodating a battery 12. Embodiments of the present application further provide an end plate assembly of a battery module, the end plate assembly can include a pair of end plates 10 and an energy absorbing component 13, the energy absorbing component 13 is arranged between the battery 12 and the end plate 10. That is, after the battery module is assembled, the energy absorbing component 13 is clamped between the battery 12 and the end plate 10. The end plate 10 can be a rigid end plate, such as a steel end plate.

The energy absorbing component 13 according to embodiments of the present application can specifically include a stress bearing plate 130 and a bending plate 131 which are arranged along an opposite direction between the battery 12 and the end plate 10, that is, the arrangement direction of the stress bearing plate 130 and the bending plate 131 is a direction from the battery 12 to the end plate 10. The bending plate 131 and the stress bearing plate 130 are connected with each other, the connection there between can be achieved by adhesion and the like. Alternatively, the energy absorbing component 13 can also be integrated as a whole. The bending plate 131 has elastic deformation amount in the opposite direction between the battery 12 and the end plate 10, that is, the bending plate 131 can elastically deform in the direction from the battery 12 to the end plate 10. Specifically, since the bending plate 131 has bending property, the bending plate 131 can deform when bearing an external force.

After the battery module is assembled, if the battery 12 of the battery module expands and applies an expansion force to the energy absorbing component 13, then the bending plate 131 of the energy absorbing component 13 will deform elastically, so as to absorb the expansion force of the battery 12. Therefore, the end plate 10 of the end plate assembly receives a smaller expansion force, which can prevent the battery module from failure, so as to improve structural strength of the battery module.

It should be understood that, only one stress bearing plate 130 and one bending plate 131 may be arranged, however, in order to improve absorbing effect of the energy absorbing component 13, a plurality of stress bearing plates 130 can be arranged, the stress bearing plates 130 are arranged parallel to each other. After a plurality of stress bearing plates 130 is arranged, the whole volume of the energy absorbing component 13 is increased, and the ability of bearing expansion force is improved accordingly. Preferably, one end of the energy absorbing plate 13 can be connected with the end plate 10 through the stress bearing plate 130, the other end of the energy absorbing plate 13 abuts with the battery 12 through the stress bearing plate 130. That is, the portion of the energy absorbing component 13 directly acting with both the end plate 10 and the battery 12 is the stress bearing plate 130, so as to increase the acting area between the energy absorbing component 13 and the end plate 10, and between the energy absorbing component 13 and the battery 12, thereby improving performance of the energy absorbing component 13.

In order to further improve ability of absorbing expansion force of the energy absorbing component 13, a bending plate 131 is arranged between each two adjacent stress bearing plates 130. At this time, each stress bearing plate 130 can form a stress bearing surface thereon, a plurality of stress bearing plates 130 can form a multi-stage stress bearing surface, expansion force of the battery 12 is gradually transferred to the plurality of stress bearing plates 130 stage by stage, so as to reduce expansion force stressed by the end plate 10, resulting in less deformation of the end plate 10, or even no deformation.

Figure 5:
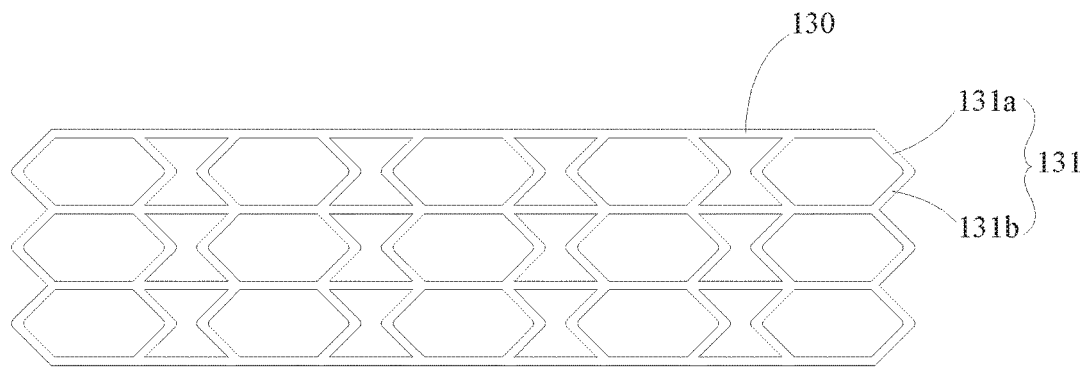
FIG. 5 is a structural schematic diagram of an energy absorbing component in an end plate assembly of a battery module provided by an embodiment of the present application.

Further, a plurality of bending plates 131 is arranged between two adjacent stress bearing plates 130, the bending plates 131 are spaced from each other, so that the entire energy absorbing component 13 presents a cell-like structure shown in FIG. 5. As the number of the bending plate 131 increasing, stability between adjacent stress bearing plates 130 become higher, so that larger expansion force can be absorbed, thereby achieving the purpose of improving the energy absorbing effect of the energy absorbing component 13. The specific number of the bending plate 131 can be determined according to the size the battery module, magnitude of expansion force of the battery module and the like.

The specific structure of the bending plate 131 can be appropriately selected according to actual demands. In an exemplary embodiment, the bending plate 131 can include a first flat plate 131a and a second flat plate 131b. One end of the first plate 131a and one end of the second flat plate 131b can be connected with each other to form a V-shaped structure, the other end of the first flat plate 131a and the other end of the second flat plate 131b can be respectively connected with an adjacent stress bearing plate 130. Adopting such a bending plate 131 not only can simplify processing of the energy absorbing component 13, but also can optimize the elastic deformation ability of the bending plate 131, so that larger expansion force can be absorbed by the energy absorbing component 13. It should be noted that, the first flat plate 131a and the second flat plate 131b present a flat-plate structure when they do not stress force; when they stress force, both of them may not keep the flat-plate structure, but bend to a certain extent.

Preferably, when stressing expansion force, the above-mentioned bending plate 131 will deform transversely. That is, the first flat plate 131a and the second flat plate 131b have deforming path in a direction away from an opening direction of an outermost V-shaped structure (i.e., the exterior of the space) formed by the adjacent stress bearing plates 130. When a plurality of the bending plates 131 is arranged, the transverse deformation direction of each bending plate 131 will affect the state of the adjacent stress bearing plate 130. If the transverse deformation direction of each stress bearing plate 130 is identical, the acting force stressed on the stress bearing plate 130 will accumulate, leading to that a significant relative movement trend will be easily generated between adjacent stress bearing plates 130. On the contrary, if the transverse deformation directions of the bending plates 131 are opposite to each other, a stressed state shown in FIG. 6 will be formed. In such a situation, the expansion force F applied on the energy absorbing component 13 by the battery 12 is decomposed into two component forces F1 and F2. The F1 and F2 can be further decomposed in a vertical direction and a horizontal direction, respectively. The component forces in the horizontal direction are opposite to each other, and are then counteracted, so as to further reduce the expansion force stressed by the end plate 10.

Figure 6:
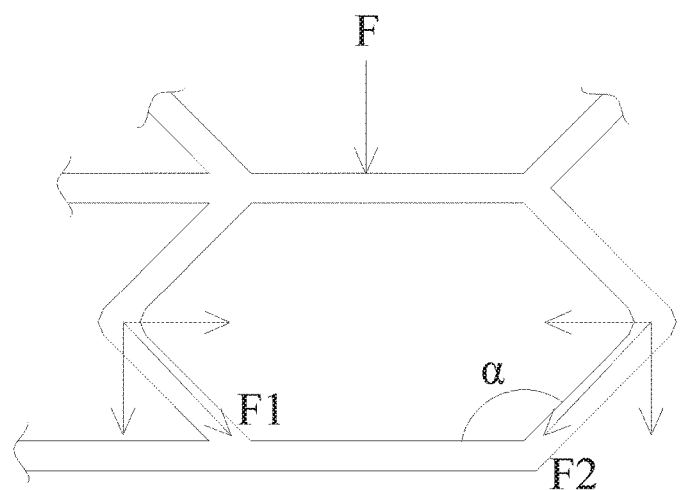
FIG. 6 is a schematic diagram showing analysis of partial force stressed by the energy absorbing component shown in FIG. 5.

Preferably, each stress bearing plate 130 is a flat plate, and the stress bearing plates 130 are parallel to each other. It should also be noted that, the stress bearing plate present a flat-plate structure when not stressed, when being stressed, they may not keep the flat-plate structure, but bend to a certain extent. When the bending plate 131 includes the first flat plate 131*a* and the second flat plate 131*b*, an included angle (as shown in FIG. 6, an included angle α between the second flat plate 131*b* and the stress bearing plate 130) between the first flat plate 131*a* and the stress bearing plate 130, and between the second flat plate 131*b* and the stress bearing plate 130 will affect the ability of absorbing expansion force of the energy absorbing component 13. As a result, the ability of absorbing expansion force of the energy absorbing component 13 can be improved through optimizing the angle. Correspondingly, the value of the angle can be designed according to the expansion force transferred onto the end plate 10, the rigid parameter of the end plate 10 and the like.

In order to further absorb the expansion force of the battery 12, the end plate assembly of a battery module provided by embodiments of the present application can also include a plastic end plate 14. The plastic end plate 14 is provided with mounting space, the energy absorbing component 13 is mounted in the mounting space. Specifically, the plastic end plate 14 can be provided with a mounting slot, the energy absorbing component 13 is placed in the mounting slot, at this time, a side of the energy absorbing component 13 can contact with the end plate 10 or the battery 12, the other side contacts with a slot bottom of the mounting slot. In an exemplary embodiment, the plastic end plate 14 can be provided with a through hole, the above-mentioned mounting space is formed in the through hole, and the energy absorbing component 13 goes through the through hole. Such a structure can allow two opposite sides of the energy absorbing component 13 contacting with the end plate 10 and the battery 12, respectively, so as to increase the deformable space of the energy absorbing component 13, thereby improving energy absorbing effect.

Besides, in an arrangement that the energy absorbing component 13 is arranged opposite to the end plate 10, it may be selected that the whole area of the end plate 10 is substantially covered by the energy absorbing component 13. However, considering that the expansion force of the battery 12 mainly focuses on the central portion of the battery 12, the expansion force at two sides is relatively smaller. Therefore, in order to control the size of the energy absorbing component 13 while absorbing the expansion force, the energy absorbing component 13 can be arranged only on the central portion of the battery 12. That is, in a projection along the opposite direction between the battery 12 and the end plate 10, a projection surface of the energy absorbing component 13 is located at the central portion of a projection surface of the end plate 10.

Based on the above-mentioned structure, embodiments of the present application also provide a battery module. The battery module includes a battery 12 and an end plate assembly of a battery module, the end plate assembly is any one of the end plate assemblies described in above embodiments.

The above are just the preferred embodiments of the present application, and will not limit the present application, for those skilled in the art, the present application can have various modifications and variations. Any modifications, equivalent replacements and improvements made within the spirits and principles of the present application shall all fall into the protection scope of the present application.

The invention claimed is:

1. An end plate assembly of a battery module, comprising an end plate and an energy absorbing component, wherein the energy absorbing component is arranged between the end plate and a battery in the battery module, the energy absorbing component comprises a stress bearing plate and a bending plate, and the bending plate and the stress bearing plate are connected with each other, wherein the energy absorbing component comprises a plurality of stress bearing plates, the plurality of stress bearing plates is arranged parallel to each other, a plurality of bending plates is arranged between each two adjacent stress bearing plates, and the plurality of bending plates is spaced from each other, and each of the plurality of bending plates comprises a first flat plate and a second flat plate, one end of the first flat plate and one end of the second flat plate are connected with each other to form a V-shaped structure, the other end of the first flat plate and the other end of the second flat plate are respectively connected with adjacent stress bearing plates.

2. The end plate assembly of a battery module, according to claim 1, wherein one end of the energy absorbing component is connected with the end plate through one of the stress bearing plates, and the other end of the energy absorbing component abuts with the battery through another one of the stress bearing plates.

3. The end plate assembly of the battery module according to claim 1, wherein the first flat plate and the second flat plate have a deforming path in a direction away from an opening direction of an outermost V-shaped structure formed by adjacent stress bearing plates.

4. The end plate assembly of the battery module according to claim 3, wherein deformation directions of every two adjacent bending plates are opposite to each other.

5. The end plate assembly of the battery module according to claim 1, further comprising a plastic end plate, wherein a through hole is defined in the plastic end plate, and the energy absorbing component goes through the through hole.

6. A battery module, comprising the end plate assembly of the battery module according to claim 1.

* * * * *